United States Patent [19]

Serlin

[11] 4,212,900
[45] Jul. 15, 1980

[54] SURFACE ALLOYING METHOD AND APPARATUS USING HIGH ENERGY BEAM

[76] Inventor: Richard A. Serlin, 10 Barbour La., Bloomfield Hills, Mich. 48013

[21] Appl. No.: 933,241

[22] Filed: Aug. 14, 1978

Related U.S. Application Data

[63] Continuation of Ser. No. 792,344, Apr. 29, 1977, abandoned.

[51] Int. Cl.$^2$ .............................................. B05D 3/06
[52] U.S. Cl. ................................. 427/53.1; 427/376.8; 427/383.9; 148/127; 428/939
[58] Field of Search ...................... 427/53, 423, 376 H, 427/383 D

[56] References Cited

U.S. PATENT DOCUMENTS

| | | | |
|---|---|---|---|
| 267,879 | 11/1882 | Haegele | 427/376 H |
| 2,775,531 | 12/1956 | Montgomery et al. | 427/423 |
| 3,310,423 | 3/1967 | Ingham | 427/423 |
| 3,594,261 | 7/1971 | Broerman | 427/53 |
| 4,009,364 | 2/1977 | Ladstadter | 427/53 |
| 4,125,926 | 11/1978 | Gale | 427/53 |

FOREIGN PATENT DOCUMENTS

| | | | |
|---|---|---|---|
| 2061105 | 10/1973 | Fed. Rep. of Germany | 427/376 H |
| 1155124 | 6/1969 | United Kingdom | 427/53 |

*Primary Examiner*—John H. Newsome
*Attorney, Agent, or Firm*—Harness, Dickey & Pierce

[57] ABSTRACT

A method and apparatus for alloying the surface of a substrate with a suitable alloying material in which the alloying material is placed on the surface of the substrate and a beam of high intensity energy is directed at the alloying material for a predetermined short period of time. The duration of the predetermined short period of time and the intensity of the high intensity beam are cooperatively selected so that the intensity and duration are sufficient to melt the alloying material, and cause alloying of said alloying material with the substrate in a zone contiguous with the surface on which the alloying material has been placed, and yet there is no substantial heating of the body of the substrate below the contiguous zone such that the dissipation of heat from the contiguous zone into the body of the substrate causes rapid solidification of the now-alloyed material and such that dimensional changes as by warping or the like or changes in heat treatment of the body of the substrate are prevented. In the preferred embodiment, the high intensity beam is a laser beam.

49 Claims, 19 Drawing Figures

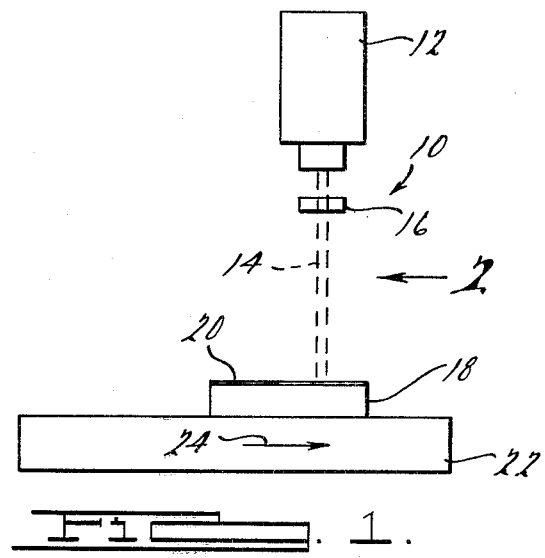
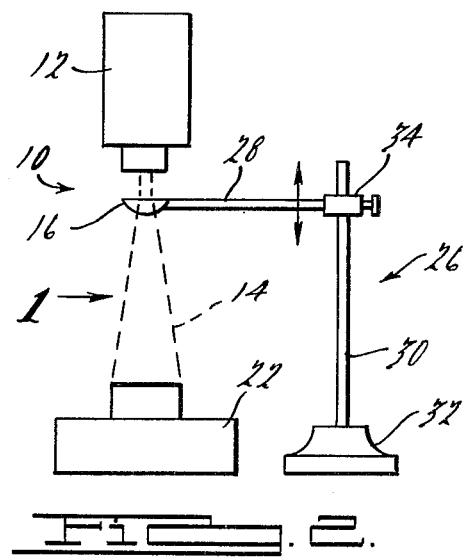
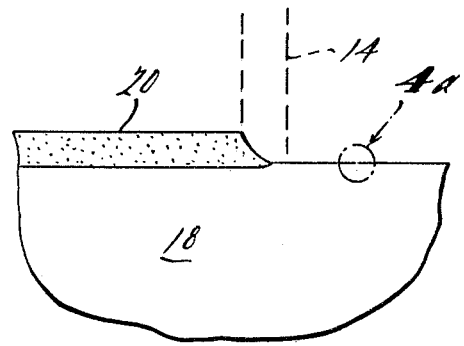
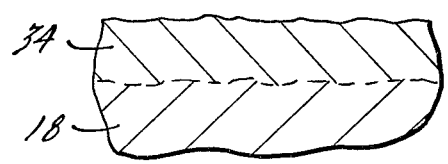
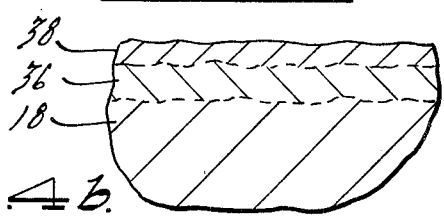
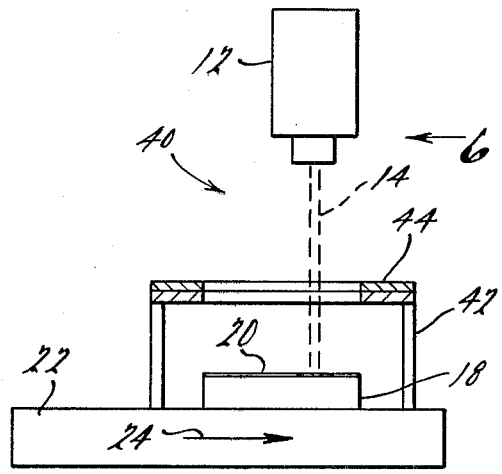
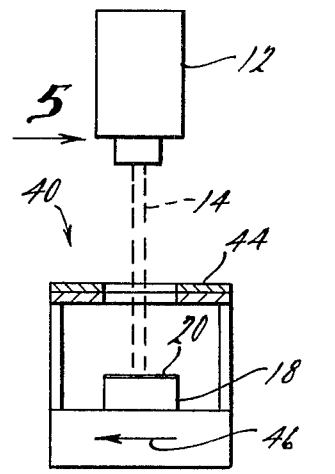

SURFACE ALLOYING METHOD AND APPARATUS USING HIGH ENERGY BEAM

This is a continuation of application Ser. No. 792,344, filed Apr. 29, 1977, now abandoned.

BACKGROUND AND SUMMARY OF THE INVENTION

Applicant has perfected and has been practicing a commercial process for several years for forming an alloy on the surface of a substrate. In this commercial process, an electrode is formed of the alloying material, for example, a carbide material. The electrode is connected to a pulse generating machine which creates repetitive spark discharges between the electrode and the substrate when the electrode is in engagement with the substrate. The electrode is rotated while in engagement with the substrate and caused to traverse the substrate to distribute the alloying material over the surface of the substrate. In this commercial process, it is believed that small amounts of the electrode material melt during each discharge and are transferred to the substrate. The discharge is also effective to either melt, soften, or otherwise create the conditions for alloying at the surface of the substrate so that the electrode material forms an alloy with the substrate material at the zone contiguous with the surface.

The above prior method, when correctly practiced, provides a very satisfactory surface alloy and has achieved a large degree of commercial success. However, the method is time consuming since there is only a small contact area between the surface of the substrate and the electrode. The small area of contact must traverse the entire surface in order to provide a continuous surface alloy over the entire surface. That operation is obviously time consuming. Additionally, this prior method is normally achieved by manual movement of the electrode across the surface area, and hence, the uniformity of the surface alloy and the continuity of the surface alloy over the entire surface depends upon the skill of the operator of the process. Furthermore, this prior method is not especially suitable for either automation or high levels of mass production.

In the prior patent art relating to a similar surface alloying method, a suggestion has been made that the surface be sprinkled with an alloying powder or covered with a slurry of alloying material prior to the surface alloying process. However, the powder or slurry method in the case of a rotating electrode/electric spark discharge method is not especially satisfactory because the electrode will tend to push the powder or slurry into piles as it is moved across the surface thereby making it extremely difficult to achieve a uniform distribution of the surface alloy.

The present invention provides a method and apparatus for forming a surface alloy which is capable of providing a uniformly alloyed surface, is particularly suitable for automation, and can substantially increase the speed of surface alloying over the prior method. In accordance with the present invention, a suitable alloying material is placed on the surface of a substrate and a beam of high intensity energy is directed at the alloying material for a predetermined short period of time. The duration of the predetermined short period of time and the intensity of the high intensity beam are interrelated and must be judiciously selected to achieve a suitable alloying action without damaging the substrate. By way of illustration, the substrate may be a machine tool part of critical dimensions and have a heat treatment which establishes critical strength or hardness properties of the tool. The surface must be alloyed without detrimentally altering the dimensions of the tool or detrimentally affecting the heat treatment of the substrate of the body of the tool. These conditions are met by restricting the period of time that the beam is directed upon a given area of the surface of a very short period of time so that the transfer of heat to the body of the substrate is minimized and heating is substantially restricted to the zone of the substrate which is contiguous the surface. The time is restricted by selecting a very high intensity beam of energy, such as a laser beam, which is capable of melting an alloying material in that very short period of time and is additionally capable of heating a zone of the substrate which is contiguous the surface during that short period of time sufficiently to provide an alloying action between the alloying material and the substrate material in the contiguous zone. If the intensity of the beam is too low, the period of time that the beam must be directed to a given area of the surface will be too long to avoid substantial heating of the substrate, and accordingly, the substrate may be detrimentally affected. The short period of time in combination with the related high intensity beam has an additional desirable effect. Particularly, when the heating is restricted to the contiguous zone the main body of the substrate acts as a heat sink into which the heat introduced into the zone contiguous the surface may be rapidly dissipated so that the alloyed surface zone is rapidly solidified. As a result, the treated parts may be handled soon after treatment without special precautions. The rapid cooling is also beneficial in that it provides the desired hardness of certain alloys. Additionally, surface deformation such as may be caused by "running" of the molten alloying material is avoided.

The preferred high intensity beam is a laser beam. Lasers of sufficiently high intensity to practice this method are presently in existence and known to the scientific community.

The preferred method of restricting the predetermined short period of time during which the beam is directed to a particular portion of the surface of the substrate is through scanning or traversing of the beam relative to the substrate. Either the beam or the part may be moved relative to the other so that the beam traverses or scans the surface area. Several means of scanning are disclosed in more detail hereinafter. On small parts, it may be desirable to restrict the time during which the beam is directed at the surface using a timing circuit rather than scanning the beam relative to the surface.

The scanning operation of the present invention makes this invention particularly suitable for automation, as will be apparent in view of the preferred embodiments of the apparatus of this invention. Automated scanning also assures that the surface alloy is created in a uniform manner and without the variations that can be expected if the alloying process is accomplished manually.

BRIEF DESCRIPTION OF THE DRAWINGS

FIG. 1 is a side view of a first embodiment of the present invention;

FIG. 2 is an end view of the first embodiment of the present invention;

FIG. 3 is a somewhat idealistic illustration of the surface alloying process of the present invention;

FIGS. 4a and 4b are somewhat idealistic representations of photomicrographs of the surface alloy created by the method and apparatus of this invention;

FIG. 5 is a side view of a second embodiment of the present invention;

FIG. 6 is an end view of the second embodiment of the present invention;

DESCRIPTION OF THE PREFERRED EMBODIMENTS

Figure 7:
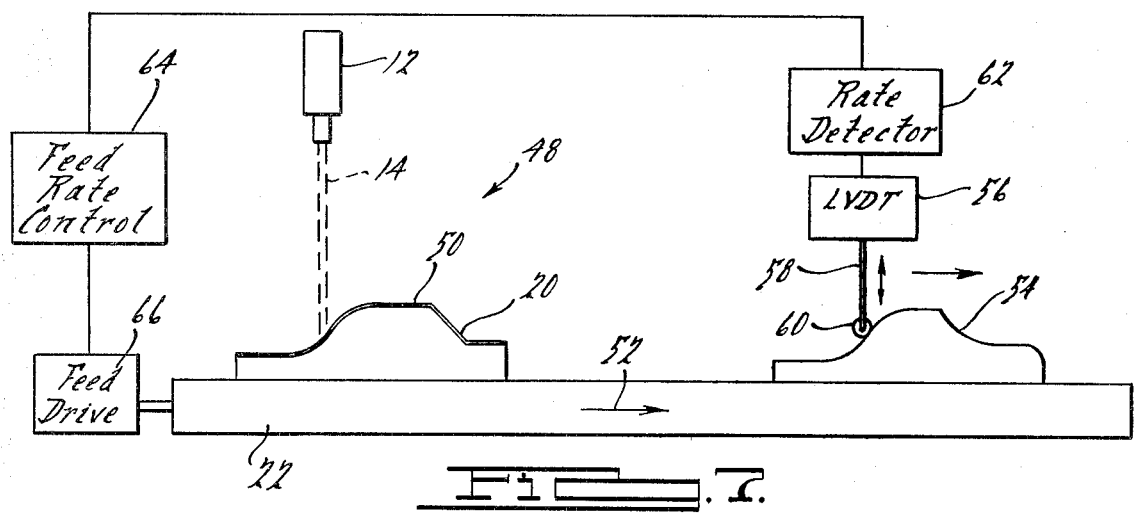
FIG. 7 is a side view of a third embodiment of the present invention.

In FIGS. 1 and 2, the first embodiment 10 of the present invention is illustrated. The embodiment 10 includes a source 12 which emits a beam 14 of high intensity energy. Preferably, the source 12 generates a high intensity laser beam. The beam 14 passes through a cylindrical lens 16 to a workpiece 18 comprising a substrate of a material which is suitable for alloying by the present process. An alloying material 20 has been placed on the surface of the substrate 18. The beam 14 is moved relative to the substrate 18 by movement of a table 22 in the direction of the arrow 24.

The cylindrical lens 16 can be made of a material which is resistant to the effects of a laser beam. Such lenses are known to those skilled in the laser art. As can be best seen in FIG. 2, the cylindrical lens 16 is effective to diverge the beam 14 so that the beam has a width equal to the width of the workpiece 18 at the surface of the workpiece to be treated. The width of the beam 14 can be adjusted for varying workpiece widths by a suitable stand 26 for raising and lowering lens 16 relative to the workpiece 18. By way of illustration, the stand 26 may consist of a cross bar 28 which supports the cylindrical lens 16, a vertical post 30 which is anchored by a base 32, and a slide adjusting mechanism 34 for securing the cross bar 28 at various positions along the axis of the vertical post 30.

The speed of the table 22 in the direction of arrow 24 is selected so as to cause any given portion of the upper surface of the workpiece 18 to be exposed to the beam 14 for a predetermined short length of time. The rate of feed of the table 22, and hence the predetermined short length of time, is adjusted to accomplish the alloying results as described in the Background and Summary of the Invention. In this regard, the duration of the predetermined period of time decreases as the rate of feed of the table 22 increases. Additionally, as the effective intensity of the beam 14 is decreased somewhat as the width of the beam 14 is increased via the cylindrical lens 16, it is desirable to decrease the rate of feed to increase the duration of the predetermined length of time with increasing beam widths. In no event should the beam width be increased so that the effective intensity of the beam is insufficient to meet the criteria for alloying which are stated in the Background and Summary of the Invention.

In FIG. 3, an idealized representation of the alloying process according to this invention is provided. The alloying material 20 which has been placed on the substrate 18 is seen to melt under the influence of the high intensity beam 14 and form a slightly elevated surface relative to the original surface of the substrate 18. Note that the apparent volume of the alloying material has been substantially reduced by the melting effect of the beam 14. This is due to the fact that in most forms, the alloying material 20 is less dense than its solid form for ease of application of the alloying material 20. This will be better appreciated in connection with the more detailed description of the alloying materials presented in connection with FIGS. 15 through 18.

In FIGS. 4a and 4b, idealized photomicrographs of the alloyed surfaces are illustrated. In FIG. 4a, the substrate is seen at 18. The alloy or composition created by the alloying material 20 and the material of the substrate 18 is illustrated at 34. Note that this is not a surface coating or surface plating process, but rather, a surface alloying process. By surface alloying, the composition and characteristics of the surface are controlled and can be established as desired within the constraints of available materials and the ability of the materials to alloy. Note that the surface of the material is slightly irregular. However, this slightly irregular surface is not normally detrimental, and in some applications can be advantageous. If desired, the surface can be ground to obtain a finer surface finish. In FIG. 4b, another possible effect is illustrated. In FIG. 4b, the substrate is shown at 18, the alloy or composition of the substrate material and the alloyed material is illustrated at 36, and a substantially pure form of the alloyed material is shown at 38. This may be accomplished by using heavier layers of the alloying material 20 prior to processing, or by processing the workpiece a second time using a second layer 20. On occasion, it is desirable to have a relatively pure form of the alloying material at the surface of the workpiece.

In FIGS. 5 and 6, a second embodiment 40 of an apparatus and method according to the present invention is illustrated. Like components have been provided with like numbers. In the embodiment 40 of FIGS. 5 and 6, the lens is dispensed with, and therefore, the intensity of the beam 14 is not reduced. In the embodiment 40 of FIGS. 5 and 6, a masking structure 42 has been provided to avoid damage to the fed table 22. The masking structure 42 has an ablatable masking material 44 which must be periodically replaced and is selected to be somewhat resistant to the heating effects of the high intensity beam 14. In this embodiment, the table 22 also feeds in the direction of arrow 24. However, to assure that the entire width of the workpiece 18 is traversed by the beam 14, the table is indexed in the direction of arrow 46 after each pass in the direction of arrow 24. Indexing in the direction of arrow 46 is necessary since the beam 14 has not been diverged by a lens or the like to cover the entire width of the workpiece 18.

In FIG. 7, yet another embodiment 48 of the present invention is illustrated. In the embodiment 48, a workpiece 50 is treated on its upper surface to form an alloy with alloying material 20. The workpiece 50 is positioned on a table 22 which is fed in the direction of arrow 52. A model or duplicate workpiece 54 is positioned at a second location on table 22 and is oriented in the same direction as workpiece 50 so as to be fed in like manner with the workpiece 50. A linear variable differential transducer 56 has a sensing shaft 58 and a sensing roller 60 connected thereto. The roller 60 is biased into engagement with the model or duplicate workpiece 54 so that the shaft 58 is moved in the axial direction in accordance with changes in the contour of the model 54. The roller 60 is positioned to contact the model 54 at a position which is correlative to the position on workpiece 48 at which the beam 14 is directed. To accommodate sensing and transportation lags in the system, it may be desirable to have the roller 60 contact the model 54 at a position slightly in advance of the portion of the workpiece 50 at which the beam 14 is directed, i.e., to the left of that portion in the embodiment of FIG. 7.

The linear variable differential transducer 56 provides an output signal to a rate detector 62 which is representative of the linear or axial position of the shaft 58, and hence, the vertical position of the point of contact between the roller 60 and the workpiece model 54. The rate detector 62 provides a signal to a feed rate control 64 which represents the rate of change of the position of the wheel 60. The feed rate control 64 in turn provides a signal to a feed drive unit 66 which controls the rate of feed of the table 22 in accordance with the rate of change of the roller 60. More particularly, as the rate of change increases, the feed rate decreases. The purpose of the rate control system of FIG. 7 is to adjust the rate of feed of the beam 14 relative to the workpiece 50 so that the duration of the predetermined short period of time at which the beam 14 is directed to a given area on the surface of the workpiece 50 remains substantially constant regardless of changes in the profile of the workpiece 50. If the feed rate of the table 22 were constant, at portions of the workpiece 50 at which the surface was slanted upwardly or downwardly, the effective feed rate of the beam 14 relative to the surface portions of the upwardly or downwardly extending surfaces would be increased. As a result, the alloying process would not be uniform over the entire surface of the workpiece 50. The invention of FIG. 7 overcomes this difficulty by adjusting the feed rate in accordance with the rate of change of elevation of the workpiece 50, i.e., the rate of change of the workpiece 50 in the direction of the axis of beam 14 to maintain the time of exposure of the surface to the beam 14 substantially constant.

Figures 8, 9:
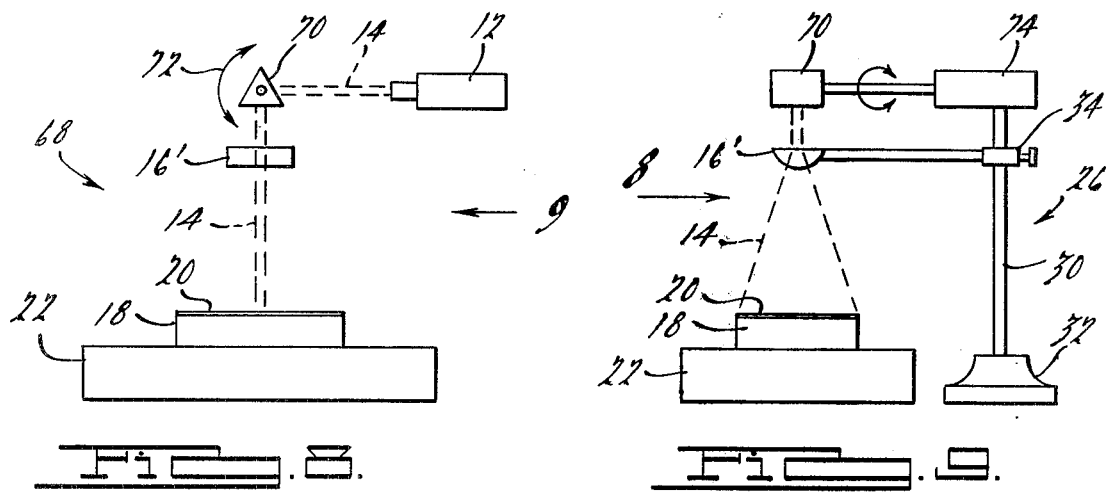
FIG. 8 is a side view of a fourth embodiment of the present invention.
FIG. 9 is an end view of the fourth embodiment of the present invention.

In FIGS. 8 and 9, an embodiment 68, which is somewhat similar to the embodiments of FIGS. 1 and 2, is illustrated. In the embodiments of FIGS. 8 and 9, the beam 14 is caused to traverse the workpiece 18 so as to provide relative motion between the beam 14 and the workpiece 18, rather than causing the workpiece 18 to traverse the beam 14 by movement of a feed table as illustrated in FIGS. 1 and 2. The beam 14 is caused to traverse the workpiece 18 by means of a rotatively-mounted prism 70 which receives the beam 14 at one face thereof and is effective to bend the beam 14 approximately 90° as illustrated so that the beam emanates from another face thereof. More particularly, the beam 14 is directed by the source 12 in a horizontal direction toward the one surface of the prism 70. The prism 70 thereafter causes the beam to be directed downwardly from the other surface towards the workpiece 18. The angle at which the beam 14 emanates through the prism 70 can be changed through rotation of the prism 70 in the directions of the arrows 72. This rotation can be conveniently accomplished by an oscillating motor 74 which is connected to prism 70 by a suitable shaft. The motor 74 has limit stops so as to cause limited rotation of the prism 70 which results in the traverse of the beam along the full length of the surface of the workpiece 18, but not in excess thereof. A cylindrical lens 16' serves the same purpose as the lens 16 of FIGS. 1 and 2 but is somewhat longer than the cylindrical lens 16 of FIGS. 1 and 2 to accommodate the traverse of the beam 14.

Figures 10, 11, 12:
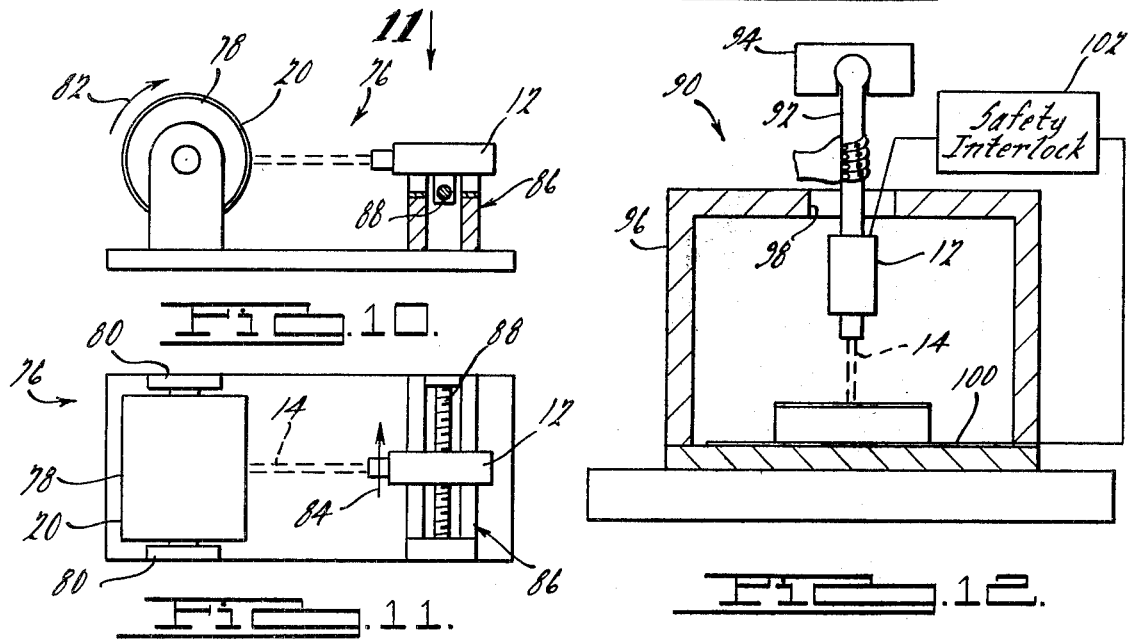
FIG. 10 is a side view of a fifth embodiment of the present invention.
FIG. 11 is a top view of the fifth embodiment of the present invention.
FIG. 12 is a side view of a sixth embodiment of the present invention.

In FIGS. 10 and 11, yet another embodiment 76 of the present invention is shown which is especially adapted for alloying the exterior surface of a cylindrical body, such as shown at 78. The cylindrical body 78 is mounted on drive arms 80 for rotation of the body 78 about its central axis in the direction of arrow 82. The source 12 is mounted for movement in the direction of arrow 84 in synchronism with the rotation of the body 78. This is accomplished by a feed screw arrangement 86 including a feed screw 88 which rotates in synchronism with the body 78. The synchronous feed of the source 12 and the body 78 causes the beam to inscribe a spiral path on the body 78. The feed rate is selected so that the spiral path covers the entirety of the exterior surface of the cylindrical body 78, i.e., without gaps between the spiral path inscribed by the beam 14.

In FIG. 12, another embodiment 90 of the present invention is illustrated. The embodiment 90 is especially suitable for manual control of the direction of the beam 14 to provide manual scanning of the beam 14 over the surface area to be alloyed. The embodiment of FIG. 12 is especially applicable to situations in which the surface area to be alloyed is of irregular configuration or in situations in which high rates of production are not required. The apparatus 90 includes the usual source 12 which is attached to an arm 92 which is pivotally connected to a frame member 94 by means of a ball and socket arrangement whereby the arm 92 and source 12 may be pivoted in any direction. A housing 96 surrounds the workpiece 18 and protects the operator since it is made of a material which is resistant to the beam 14 for at least a moderate period of time and inadvertent entry of foreign objects into the process area. The housing 96 has a circular opening 98 of limited diameter which restricts the angular movement of the arm 92, and hence, the maximum traverse of the beam 14. A safety interlock is provided by a temperature sensitive structure 100 which may be two thin sheets of foil separated by a meltable substance such as a plastic or wax. If the beam should inadvertently contact the layer 100, the plastic or wax will melt to cause either shorting or change in capacitance between the sheets of foil which may be detected by a safety interlock circuit 102 which in turn interrupts the power supply to the source 12. This safety interlock may be used on the other embodiments disclosed herein as well.

Figure 13:
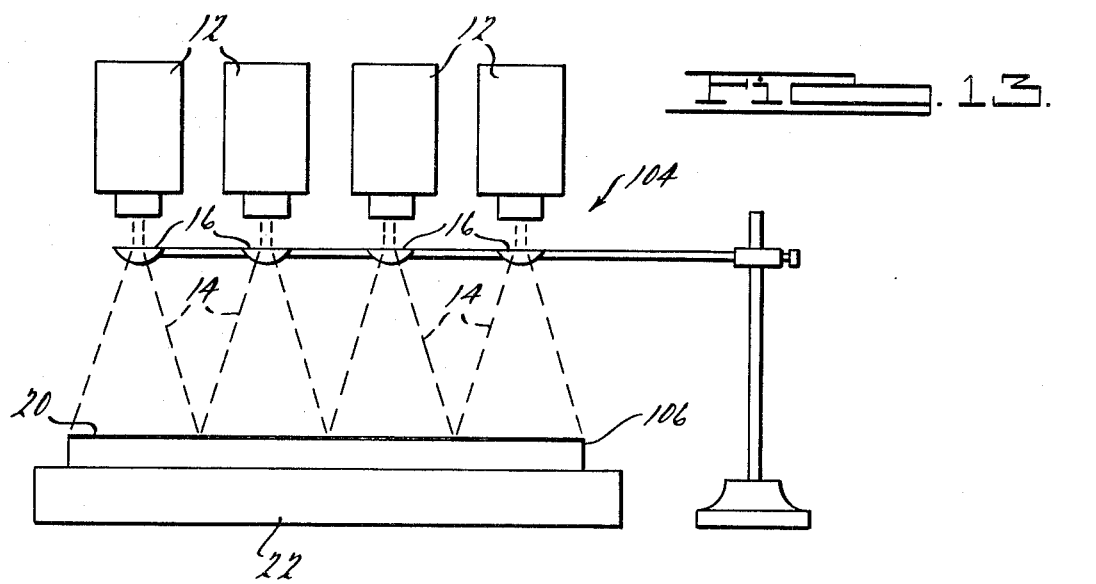
FIG. 13 is a side view of a seventh embodiment of the present invention.
Figure 16:
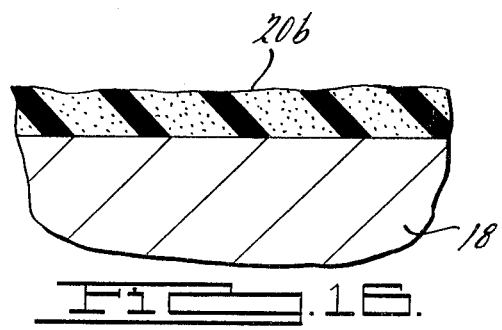
FIG. 16 is an illustration of a second method for placing the alloying material on the substrate.

In FIG. 13, yet another embodiment 104 of the present invention is illustrated. In the embodiment of FIG. 16, multiple sources 12 are used to provide expanded coverage of the beams 14. In this instance, four sources 12 are utilized in conjunction with four lenses 16 to provide a large beam width suitable for rapid surface alloying of large surface areas as illustrated at 106. Preferably, the beams 14 are diverged so that they abut at the surface of the part 106. If the beams have somewhat rounded lateral extremities, it may be desirable to overlap the beams slightly in accordance with the diminution of the effective beam strength or exposed time due to the rounding of the lateral extremities. In that event, the scanning areas will slightly overlap to a degree depending upon the diminution of the effective beam strength or exposure time due to the rounding of the lateral extremities of the beam. Calculation can be easily made based on observed beam configuration to provide an overlap which creates the most even surface alloying effect. Also, the amount of overlap can be determined empirically. This technique, incidentally, can be used in the case of the scanning embodiments 40, 48, 70 and 76 as well.

Figure 14:
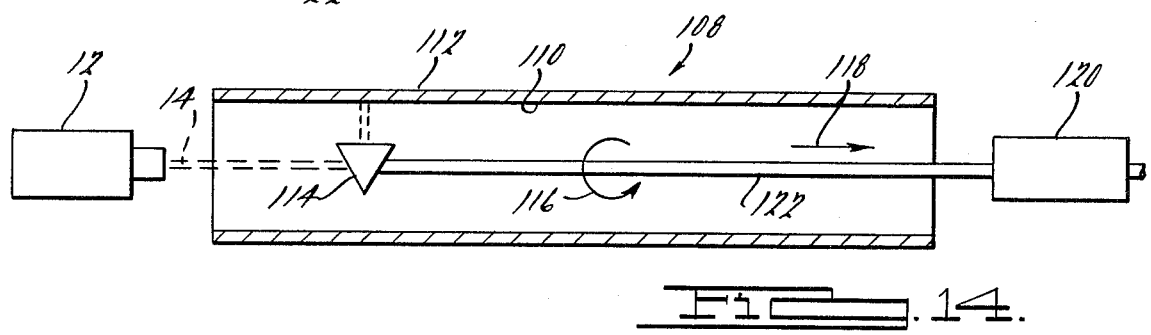
FIG. 14 is a side view of an eighth embodiment of the present invention.

In FIG. 14, an apparatus 108 is illustrated which is especially suitable for alloying the internal cylindrical surface 110 of a cylindrical member 112. The apparatus 108 utilizes a prism 114 which receives the beam 14 at one face and directs the beam at right angles towards the internal surface via a second face. The prism 114 is caused to rotate in the direction of arrow 116 and to traverse the cylindrical surface 110 in the direction of arrow 118 by a mechanism 120. The mechanism 120 may be conveniently adapted from a boring bar machine in which the using boring bar 122 carries prism 114. In the use of the apparatus 108 of FIG. 14, the beam 14 inscribes a spiral path having the same attributes as the spiral path described with respect to FIGS. 10 and 11. Note that it is convenient to have a structure which is open at both ends so that the beam 14 may be directed from one end and the bar 122 may be inserted from the other end of structure 112. However, the structure may be constructed to operate from one end only, by either providing a hollow bar 122 through which the beam 14 is directed to the prism 114, or by offsetting the bar 122 relative to its axis of rotation and directing the beam 14 along the axis of rotation of the offset bar 122.

Figure 15:
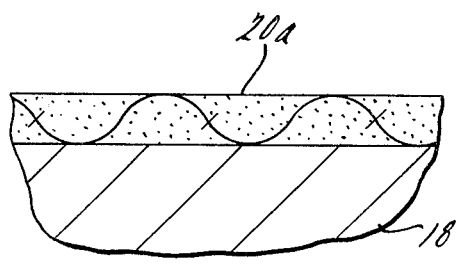
FIG. 15 is an illustration of a first method for placing the alloying material on the substrate.

FIGS. 15 through 18 illustrate different manners in which the coating 20 may be applied to the substrate 18. In FIG. 15, one such method is illustrated in which a cloth material is utilized which is impregnated with the alloying material to form a composite 20a. The cloth is preferably made of a material which is readily vaporized by the heat of the beam 14 and leaves no residue. When the beam strikes the cloth and alloying material composition 20a, the cloth is vaporized and the alloying material is melted to produce the alloying effect described in conjunction with FIGS. 3 and 4. In FIG. 16, a composition which is applied by painting is illustrated. The painted composition 20b is made of a liquid which is suitable for suspending the alloying material and which is volatile in nature so after application of the composition to the substrate 18, the liquid vaporizes leaving the alloying material on the surface of the substrate 18. The volatile liquid may be combined with a dissolved binder material for causing the alloying material to adhere to itself and to the substrate 18. Preferably, the binder material is readily vaporized upon being subjected to the heat of the beam 14. Such binder materials and volatile liquids are well known in the paint and coating art. The coating 20b may be applied by dipping the body 18 in the liquid composition, by spraying the liquid composition, or by "painting" the liquid composition using a brush or roller.

Figure 17:
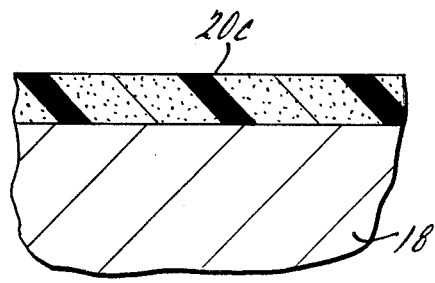
FIG. 17 is an illustration of a third method for placing the alloying material on the substrate.

In FIG. 17, yet another method for applying the alloying material is illustrated. The alloying material of FIG. 17 is in the form of a sheet 20c of a composition of the alloying materials with a solid binder. For example, sheet 20c may be alloying metals suspended in a plastic binder. The sheet 20c is placed upon the surface 18 prior to processing. Alternatively, the sheet 20c may be affixed to the substrate 18 by a suitable adhesive. The binder used in the sheet 20c, and any adhesive, are selected to be readily vaporized when exposed to the heat of the beam 14.

Figure 18:
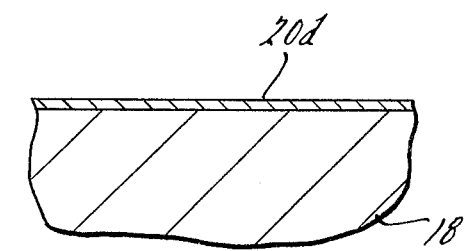
FIG. 18 is an illustration of a fourth method for placing the alloying material on the substrate.

In FIG. 18, yet another method for alloying material is illustrated. In FIG. 18, the alloying material is in the form of a thin metallic foil or sheet 20d. The foil 20d may be a single metal, a combination of metals, or a combination of metal and other alloying materials. The sheet 20d may be placed upon the substrate 18 or affixed thereto by an adhesive or the like.

It is contemplated that the method and apparatus of the present invention may be used with a wide variety of substrate materials and alloying materials. For example, various ferrous metals and alloys are suitable as substrate materials, such as steel, iron, and stainless steel. Additionally, various non-ferrous metals and alloys may be used as substrate materials, such as aluminum, copper and bronze. The alloying material may be nickel, chrome, titanium, molybdenum, copper and aluminum. Additionally, various alloys may be used as the alloying material such as TMZ (tungsten molybdenum zirconium) molybdenum borides, titanium borides, tunsten borides, and chrome borides. Furthermore, a wide variety of carbides may be used as the alloying material.

In some cases a dual alloying process is desirable. For example, in the case of a cast iron substrate, a first alloying step may add a high nickel chrome molybdenum alloy to the surface of the substrate to form an intermediate layer, and a second alloying step may add a carbide to form the outermost layer. The dual process is most desirable where the outermost layer material is not compatible with the substrate, and an intermediary material may be selected which provides a good bond between the substrate and outermost layer.

It is to be understood that the foregoing description is that of preferred embodiments of the invention. Various changes and modifications may be made without from the spirit and scope of the invention as defined by the appended claims.

What is claimed is:

1. A method for forming an alloy on the surface of a substrate at ambient temperature comprising the steps of:

placing a solidified material on the surface of said substrate while it is substantially at ambient temperature, said material being suitable for alloying with said substrate;

directing a beam of high intensity electro-magnetic energy from a source thereof at said material for a predetermined short period of time, the intensity of said high intensity beam and the duration of said predetermined short period of time being selected to: (1) substantially raise the temperature of said material above said ambient temperature solely by virtue of the energy supplied by said high intensity beam so as to melt said material during said predetermined short period of time, (2) cause alloying of said material with said substrate in a surface zone thereof, and (3) limit the amount of thermal energy transmitted to said substrate to prevent substantial elevation of the temperature of said substrate below said surface zone and to allow rapid solidification of said material thereafter due to the dissipation of thermal energy into said substrate.

2. The method of claim 1 including the step of traversing said beam relative to the surface of said substrate to cause said beam to be directed at a predetermined area of said substrate for said predetermined short period of time.

3. The method of claim 2 wherein the step of traversing said beam relative to the surface of said substrate includes the steps of holding said beam stationary and moving said substrate relative to said beam.

4. The method of claim 2 wherein the step of traversing said beam relative to the surface of said substrate includes the steps of holding said substrate stationary and moving said beam relative to said substrate.

5. The method of claim 2 wherein the rate of traverse of said beam relative to said substrate is varied.

6. The method of claim 5 wherein the rate of traverse of said beam relative to said substrate is varied in accordance with the contour of said substrate.

7. A method for forming an alloy on a contoured surface of a substrate at ambient temperature comprising the steps of:
placing a solidified material on the surface of said substrate while it is substantially at ambient temperature, said material being suitable for alloying with said substrate;
directing a beam of high intensity electro-magnetic energy from a source thereof at said material and traversing said beam relative to the surface of said substrate to cause said beam to be directed at a predetermined area of said substrate for a predetermined short period of time, the intensity of said high intensity beam and the duration of said predetermined short period of time being selected to: (1) melt said material during said predetermined short period of time solely by virtue of the energy supplied by said high intensity beam, (2) cause alloying of said material with said substrate in a surface zone thereof, and (3) limit the amount of thermal energy transmitted to said substrate to prevent substantial elevation of the temperature of said substrate below said surface zone and to allow rapid solidification of said material thereafter due to the dissipation of thermal energy into said substrate, the rate of traverse of said beam relative to said substrate is varied in accordance with the contour of said substrate such that said rate of traverse is decreased when the surface of said substrate slopes toward or away from said source of said beam.

8. The method of claim 2 wherein said beam is caused to traverse the surface of said substrate in a regular pattern so as to wholly cover a predetermined area of said substrate.

9. The method of claim 2 wherein said beam is manually directed to cause said beam to traverse the surface of said substrate.

10. The method of claim 1 including the step of directing multiple beams to said substrate with each beam having the intensity characteristic of said high intensity beam and each beam being directed for said predetermined short period of time.

11. The method of claim 1 wherein said alloying material is impregnated in an impregnatable material and including the step of vaporizing said impregnatable material by said beam by directing said beam onto said impregnated impregnatable material thereby leaving said alloying material for alloying with said substrate.

12. The method of claim 1 wherein said alloying material is combined with a liquid.

13. The method of claim 12 wherein said liquid is volatile and including the step of vaporizing said liquid by directing said beam onto said combined liquid and alloying material thereby leaving said alloying material for alloying with said substrate.

14. The method of claim 13 including the step of applying said combined liquid and alloying material by painting, spraying or dipping.

15. The method of claim 1 wherein said alloying material is combined with a solid binder.

16. The method of claim 15 including the step of vaporizing said solid binder by directing said beam onto said combined solid bonder and alloying material thereby leaving said alloying material for alloying with said substrate.

17. The method of claim 1 wherein said material is in the form of a thin metallic foil.

18. The method of claim 1 wherein said beam is a laser beam.

19. The method of claim 18 including the step of traversing said beam relative to the surface of said substrate to cause said beam to be directed at a predetermined area of said substrate for said predetermined short period of time.

20. The method of claim 19 wherein the step of traversing said beam relative to the surface of said substrate includes the steps of holding said beam stationary and moving said substrate relative to said beam.

21. The method of claim 19 wherein the step of traversing said beam relative to the surface of said substrate includes the steps of holding said substrate stationary and moving said beam relative to said substrate.

22. The method of claim 19 wherein the rate of traverse of said beam relative to said substrate is varied.

23. The method of claim 22 wherein the rate of traverse of said beam relative to said substrate is varied in accordance with the contour of said substrate.

24. The method of claim 23 wherein said rate of traverse is decreased when the surface of said substrate slopes toward or away from said source of said beam.

25. The method of claim 19 wherein optical means are used to cause said beam to traverse the surface of said substrate.

26. The method of claim 19 wherein said beam is caused to traverse the surface of said substrate in a regular pattern so as to wholly cover a predetermined area of said substrate.

27. The method of claim 19 wherein said beam is manually directed to cause said beam to traverse the surface of said substrate.

28. The method of claim 18 including the step of directing multiple beams to said substrate with each beam having the intensity characteristic of said high intensity beam and each beam being directed for said predetermined short period of time.

29. The method of claim 18 wherein said alloying material is impregnated in a impregnatable material and including the step of vaporizing said impregnatable material by said beam by directing said beam onto said impregnated impregnatable material thereby leaving said alloying material for alloying with said substrate.

30. The method of claim 18 wherein said alloying material is combined with a liquid.

31. The method of claim 30 wherein said liquid is volatile and including the step of vaporizing said liquid by directing said beam onto said combined liquid and alloying material thereby leaving said alloying material for alloying with said substrate.

32. The method of claim 31 including the step of applying said combined liquid and alloying material by painting, spraying or dipping.

33. The method of claim 18 wherein said alloying material is combined with a solid binder.

34. The mtehod of claim 33 including the step of vaporizing said solid binder by directing said beam onto said combined solid binder and alloying material thereby leaving said alloying material for alloying with said substrate.

35. The method of claim 18 wherein said material is in the form of a thin metallic foil.

36. A method for forming an alloy on the surface of a substrate am ambient temperature comprising the steps of:
    placing a solidified material on the surface of said substrate while it is substantially at ambient temperature, said material being suitable for alloying with said substrate;
    directing a beam of high intensity electro-magnetic energy at optical means in a manner so that said optical means further directs said beam at said material;
    imparting a movement to said optical means to cause said beam to traverse relative to the surface of said substrate so that said beam is directed at a predetermined area of said substrate for a predetermined short period of time, the intensity of said high intensity beam and the duration of said predetermined short period of time being selected to: (1) melt said material during said predetermined short period of time solely by virtue of the energy supplied by said high intensity beam, (2) cause alloying of said material with said substrate in a surface zone thereof, and (3) limit the amount of thermal energy transmitted to said substrate to prevent substantial elevation of the temperature of said substrate below said surface zone and to allow rapid solidification of said material thereafter due to the dissipation of thermal energy into said substrate.

37. A method according to claim 36 wherein said movement imparted to said optical means is a rotational movement.

38. A method according to claim 36 wherein said movement imparted to said optical means is a translational movement.

39. A method according to claim 36 wherein said movement imparted to said optical means is a rotational and translational movement.

40. A method according to claim 36 wherein said high intensity beam is directed at a first axis and said optical means redirects said beam of high intensity energy along a second axis which at times is different than said first axis during movement of said optical means.

41. A method according to claim 40 wherein said optical means is a prism.

42. A method according to claim 40 wherein said first axis along which said beam of high intensity energy is directed is stationary.

43. A method according to claim 40 wherein said substrate is the internal surface of a member and wherein said optical means is positioned internally of said member and said beam of high intensity energy is directed from a point externally of said member.

44. A method according to claim 43 wherein said movement imparted to said optical means is a rotational movement.

45. A method according to claim 43 wherein said movement imparted to said optical means is a translational movement.

46. A method according to claim 43 wherein said movement imparted to said optical means is a rotational and translational movement.

47. A method according to claim 2 wherein said beam is rounded at its lateral extremities, and wherein said beam is traversed relative to the surface of the substrate along laterally spaced adjacent paths so that a predetermined area at which said beam is directed lies along each of said laterially spaced adjacent paths, the lateral spacing of said adjacent paths being established to provide an overlap of said predetermined areas lying along each of said adjacent paths in accordance with the diminution of the effective beam strength due to said rounded lateral extremities of said beam.

48. The method of claim 7 wherein said beam is a laser beam.

49. The method of claim 36 wherein said beam is a laser beam.

* * * * *